United States Patent
Hasegawa et al.

(10) Patent No.: US 10,464,411 B2
(45) Date of Patent: Nov. 5, 2019

(54) RADIATOR SUPPORT COVER FOR VEHICLE

(71) Applicant: Toyota Jidosha Kabushiki Kaisha, Toyota-shi, Aichi-ken (JP)

(72) Inventors: Kuniaki Hasegawa, Toyota (JP); Kenta Kamiya, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/096,193

(22) PCT Filed: Apr. 21, 2017

(86) PCT No.: PCT/JP2017/016018
§ 371 (c)(1),
(2) Date: Oct. 24, 2018

(87) PCT Pub. No.: WO2017/188140
PCT Pub. Date: Nov. 2, 2017

(65) Prior Publication Data
US 2019/0135104 A1     May 9, 2019

(30) Foreign Application Priority Data
Apr. 26, 2016  (JP) .................... 2016-087966

(51) Int. Cl.
*B60K 11/04*   (2006.01)
*B60R 19/52*   (2006.01)
*B62D 25/08*   (2006.01)

(52) U.S. Cl.
CPC .............. *B60K 11/04* (2013.01); *B60R 19/52* (2013.01); *B62D 25/085* (2013.01); *B60R 2019/525* (2013.01)

(58) Field of Classification Search
CPC ... B60K 11/04; B60R 19/52; B60R 2019/525; B62D 25/08; B62D 25/085
See application file for complete search history.

(56) References Cited

U.S. PATENT DOCUMENTS

| | | |
|---|---|---|
| 2003/0042055 A1 | 3/2003 | Suwa et al. |
| 2006/0006012 A1 | 1/2006 | Khouw |
| 2007/0221161 A1 | 9/2007 | Khouw |

(Continued)

FOREIGN PATENT DOCUMENTS

| | | |
|---|---|---|
| JP | H05-12233 U | 1/1993 |
| JP | H06316224 A | 11/1994 |

(Continued)

*Primary Examiner* — Bryan A Evans
(74) *Attorney, Agent, or Firm* — Dinsmore & Shohl LLP

(57) ABSTRACT

A radiator support cover includes a plurality of gutter members and a plurality of external air supply vents formed between the gutter members. The external supply vents allow the external air introduced from a front grill of a vehicle to flow toward the vehicle engine. The gutter member includes an upper gutter member and a lower gutter member, which is positioned below the upper gutter member and displaced relative to the upper gutter member in a width-wise. The lower gutter member is arranged at a tilted angle with respect to the horizontal line. A notch is formed at the width-wise lower end of the lower gutter member.

20 Claims, 14 Drawing Sheets

(56) References Cited

U.S. PATENT DOCUMENTS

| | | | |
|---|---|---|---|
| 2008/0242213 A1* | 10/2008 | Mayer | B60K 13/02 |
| | | | 454/275 |
| 2010/0252346 A1 | 10/2010 | Khouw | |
| 2010/0252347 A1 | 10/2010 | Khouw | |
| 2011/0017535 A1 | 1/2011 | Salvesen | |
| 2012/0152632 A1* | 6/2012 | Azuma | F02M 35/162 |
| | | | 180/68.3 |
| 2012/0298434 A1 | 11/2012 | Khouw | |
| 2014/0150384 A1* | 6/2014 | Bunnell | F02M 35/088 |
| | | | 55/332 |
| 2017/0057337 A1 | 3/2017 | Kunimasa | |

FOREIGN PATENT DOCUMENTS

| | | |
|---|---|---|
| JP | H11-245744 A | 9/1999 |
| JP | 2003072396 A | 3/2003 |
| JP | 2004161264 A | 6/2004 |
| JP | 2005282488 A | 10/2005 |
| JP | 200627596 A | 2/2006 |
| JP | 201743316 A | 3/2017 |

\* cited by examiner

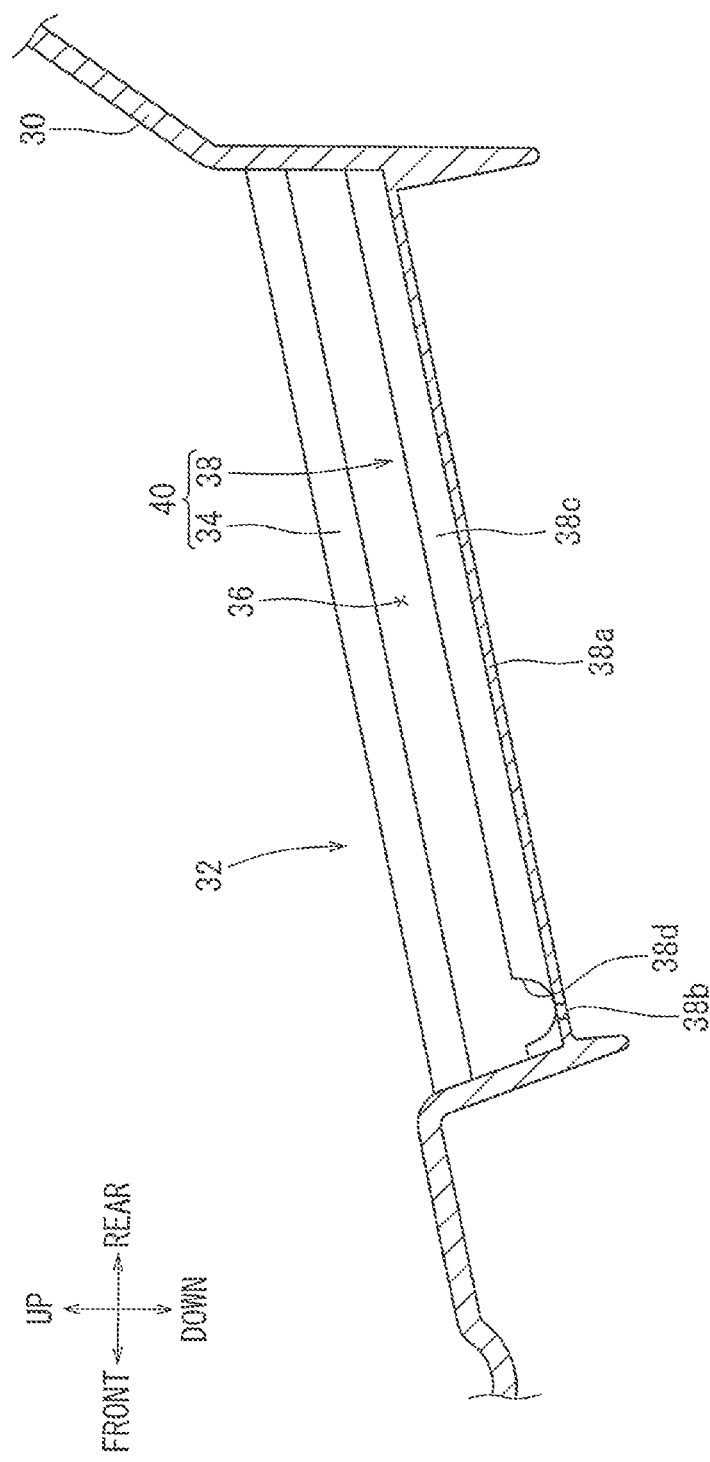
F I G. 8

RADIATOR SUPPORT COVER FOR VEHICLE

CROSS-REFERENCE TO RELATED APPLICATIONS

The present application is a U.S. National Phase entry of, and claims priority to, PCT Application No. PCT/JP2017/016018, filed Apr. 21, 2017, which claims priority to Japanese Patent Application No. 2016-087966, filed Apr. 26, 2016, both of which are incorporated herein by reference in their entireties for all purposes.

BACKGROUND

The present disclosure relates to a radiator support cover for a vehicle. For example, the radiator support cover includes a plurality of gutter members, wherein external air supply vents are formed between the gutter members. External air introduced from a front grill of the vehicle is supplied to the vehicle's engine through the external air supply vents on the radiator support cover.

As shown in FIG. 10, external air a is introduced into an automobile 101 through external air introduction ports 118a of a front grill 118 while the automobile 101 is traveling. External air a1, which forms a first flowpath branched off from the introduced external air a, is used for cooling a radiator 122 provided within an engine room 110. External air a2, which forms a second flowpath branched off from introduced external air a, is supplied to an engine (not shown) through an opening 132 of a radiator support cover 130 configured to cover an upper part of the radiator 122 (see Japanese Laid-Open Patent Publication No. 11-245744 (patent '744)). The opening 132 of the radiator support cover 130 includes a plurality of external air supply vents 136.

As shown in FIGS. 11 to 14, the radiator support cover 130 includes, for example, a plurality of external air supply vents 136 in the form of side-by-side slits in the opening 132. The external air supply vents 136 are formed and defined by the gutter members 140 which are elongated along the front-to-rear direction. Each of the gutter members 140 includes an upper gutter member 134 and a substantially U-shaped lower gutter member 138. A plurality of the gutter members 140 are arranged side-by-side, in alternating manner between upper gutter member 134 and lower gutter member 138, to cover the external air supply vents 136. Therefore, as shown in FIG. 10, an operator (not shown) is prevented from seeing the radiator 122 easily through each of the external air supply vents 136 when a front hood 120 for covering the engine room 110 is opened. Therefore, the aesthetic quality of the interior of the engine room 110 is enhanced when the front hood 120 is opened.

The radiator support cover according to the patent '744 includes a large number of the external air supply vents 136 where the width of the vents has been formed to be narrow in order to make the radiator 122 less visible to an operator through the external air supply vents 136. As a result, the number of gutter members 140 needed to achieve such effect was large. The gutter members 140 constitute passing resistance for external air a2 to be supplied to an engine. Therefore, due to the large number of the gutter members 140, the passing resistance increased to the extent that the amount of external air to be supplied to an engine was reduced.

Therefore, there has conventionally been a need of a radiator support cover for an vehicle, that while excellent in the aesthetic quality of an interior of an engine room when a front hood is opened, is at the same time able to supply a large amount of external air to a vehicle engine.

BRIEF SUMMARY

According to one aspect of the present disclosure, a radiator support cover for a vehicle includes a plurality of gutter members and a plurality of external air supply vents defined between the gutter members. The plurality of the external air supply vents allow external air introduced through a front grill of a vehicle to flow towards an engine. Each of the gutter members further includes an upper gutter member, and a lower gutter member positioned below the upper gutter member and being offset width-wise with respect to the upper gutter member. The lower gutter member is arranged at a tilted angle relative to a horizontal line. A notch is formed close to a lower end of the lower gutter member.

As described above, the upper gutter members and the lower gutter members are positioned so as to be displaced with respect to each other in the width direction. Therefore, a component, for example, a radiator, positioned beneath the gutter members, is less visible, as viewed from above the gutter members. Consequently, the aesthetic appearance of the interior of an engine room is enhanced when the front hood is opened. The external air introduced through external air introduction ports at the front grill while the vehicle is traveling may be used for cooling the radiator provided within the engine room. This introduced external air is then supplied to an engine through the plurality of the external air supply vents within the radiator support cover. The notches are formed at the gutter members, as described above, which defines the external air supply vents. The notches serve to reduce the resistance of the external air in passing through the external air supply vents. Therefore, more external air can be supplied to an engine. The notches are formed closer to the lower ends of the lower gutter members. Therefore, the notches are hardly visible from above compared with a case when the notches are formed closer to upper ends of the lower gutter members.

According to another aspect of the present disclosure, each of the gutter members is elongated along the longitudinal front-to-rear direction of a vehicle. The lower gutter member is arranged so that its front end constitutes its lower end. Therefore, the notch is positioned at the front end of the lower gutter member. Consequently, with the notch at the lower end of the lower gutter member, the amount of external air flowing into the engine room is increased compared to the case where the notch is positioned at a rear side of the lower gutter member. This is because the pressure of the radiator side positioned behind the external air introduction ports will be higher than the pressure near the external air introduction ports due to current of external air during travel of a vehicle. Therefore, the external air introduced through the external air introduction ports into the automobile flows easily into an engine room because they pass through the notch located at the front ends of the lower gutter member while avoiding from passing through higher pressure zones, as they transition from higher to lower pressure.

According to another aspect of the present disclosure, the radiator support cover includes a planar portion with an opening formed therein. The lower gutter members are arranged within the opening and are positioned below an upper surface of the planar portion of the radiator support cover. Therefore, the notches are positioned at the front ends of the lower gutter members and located below the planar portion. Therefore, the notches are concealed with the planar portion when an operator stands in front of the vehicle. This configuration prevents the notches from negatively affecting the aesthetic appearance of the interior of the engine room of the vehicle.

According to another aspect of the present disclosure, the upper gutter members and the lower gutter members are alternately arranged in the width direction, orthogonal to the longitudinal axis of the car, such that the arrangement prevents the operator from seeing the radiator through the external air supply vents while a front hood of the vehicle, covering the engine room, is opened. In this way, the aesthetic quality of the interior of the engine room can be enhanced.

According to another aspect of the present disclosure, each of the lower gutter members has a U-shaped cross-section in the plane orthogonal to the longitudinal axis of the vehicle. Therefore, water may flow along the lower gutter members.

According to another aspect of the present disclosure, each of the lower gutter members includes a bottom portion, an inner side portion positioned at an inner side of a vehicle in a lateral direction of the vehicle and an outer side portion positioned at an outer side of the vehicle. The notch is formed on the inner side portion. Therefore, the notch is no visible to the operator, since the operator stands closer to the outer side.

According to another aspect of the present disclosure, each of the lower gutter members is arranged at a tilted angle such that the inner side portion of the gutter member, having the notch, is located below the outer side portion. Therefore, the notches are not visible from above due to the outer side portion. Accordingly, the aesthetic appearance of the interior of the engine room will improve.

BRIEF DESCRIPTION OF THE DRAWINGS

FIG. 8 is a vertical cross-sectional view taken along a front-to-rear direction.

DETAILED DESCRIPTION

One exemplary embodiment according to the present disclosure will be described with reference to FIGS. 1 to 8. Hereinafter, an automobile (passenger car) 1 will be described as an example of a vehicle. The upward-downward, frontward-rearward and leftward-rightward directions in the following description correspond to the upward-downward, frontward-rearward and leftward-rightward axes described in the aforementioned drawings, and indicate the upward-downward, frontward-rearward and leftward-rightward directions that are defined as the automobile 1 is used as a reference.

Figure 1:
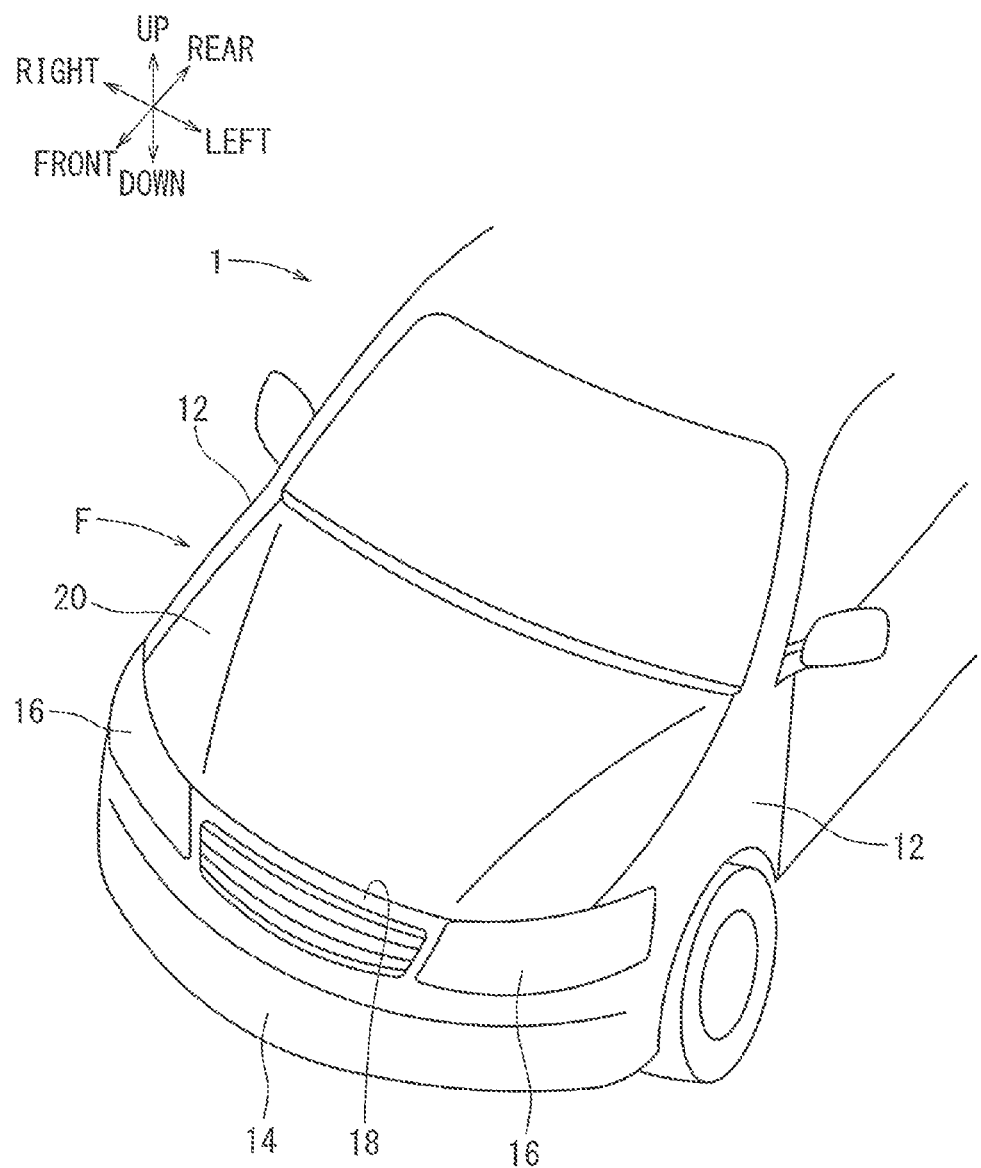
FIG. 1 is a perspective view of a front part of a vehicle according to an exemplary embodiment.
Figure 2:
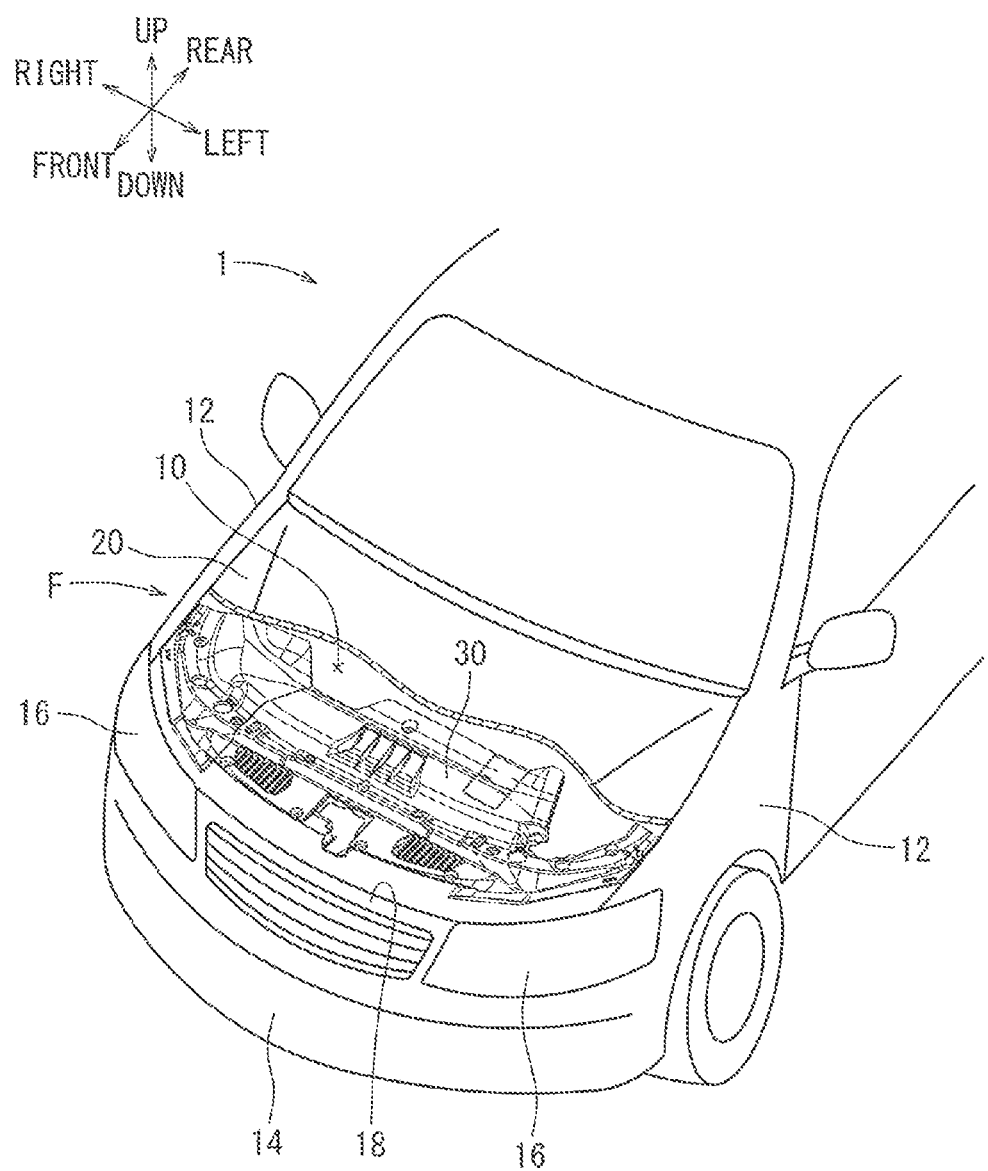
FIG. 2 is a perspective view of a front part of a vehicle in FIG. 1 while a part of a front hood is notched.
Figure 3:
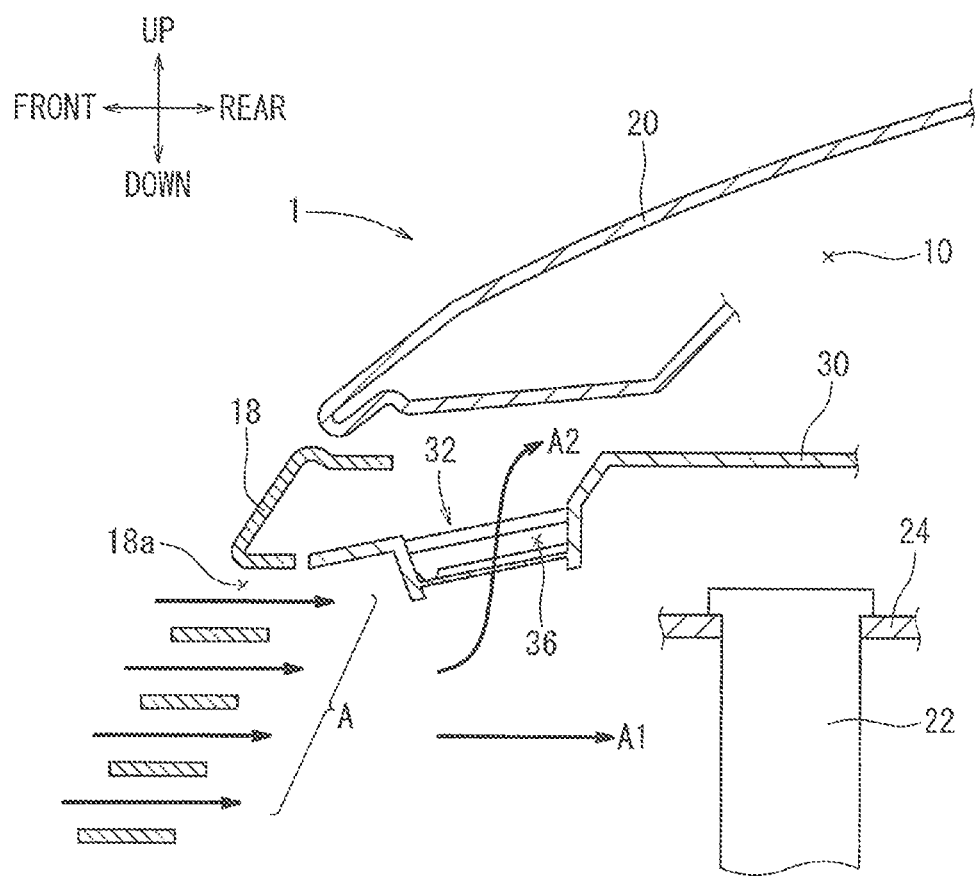
FIG. 3 is a schematic vertical cross-sectional view of FIG. 1.
Figure 4:
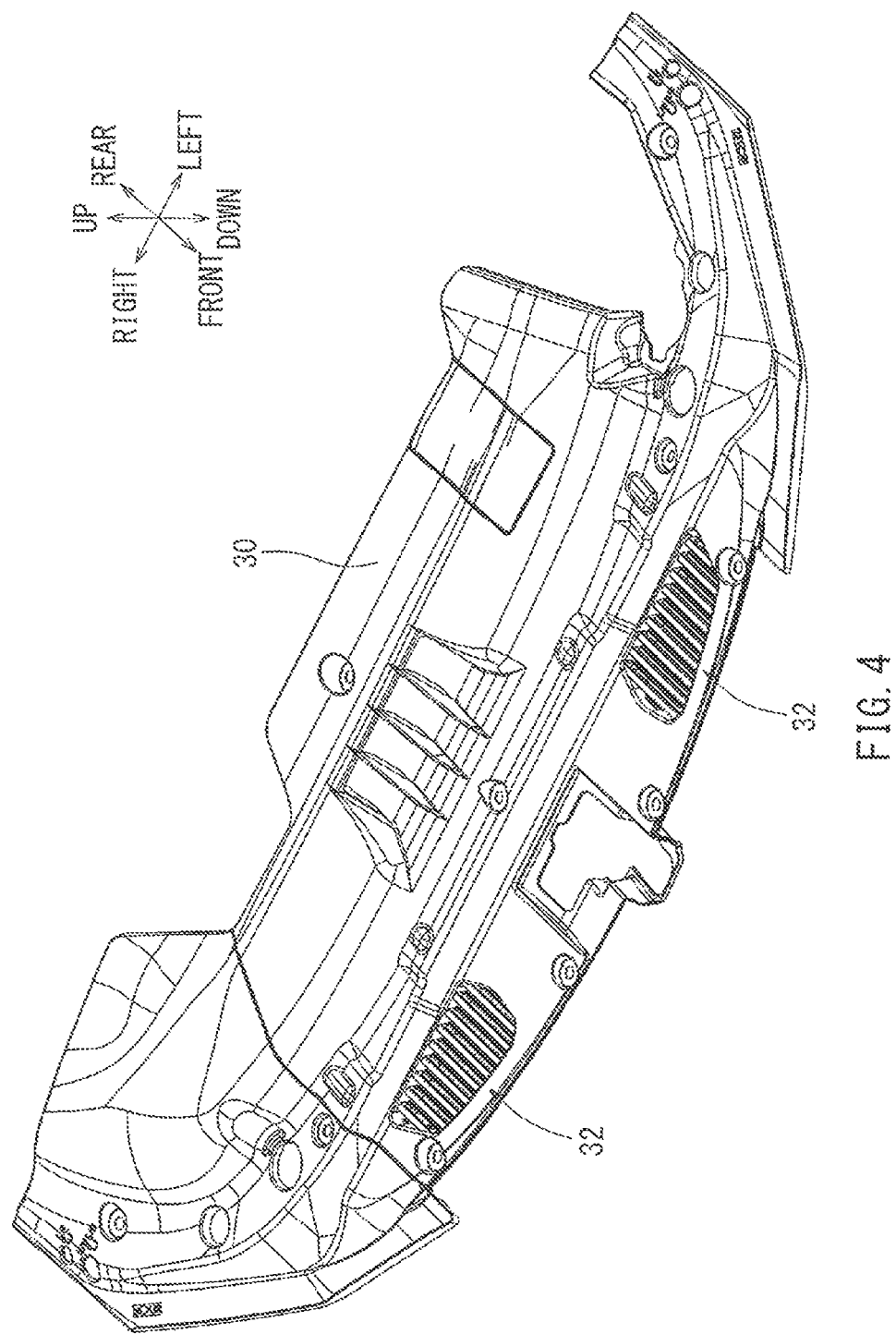
FIG. 4 is a perspective view of a radiator support cover in FIG. 2.
Figure 5:
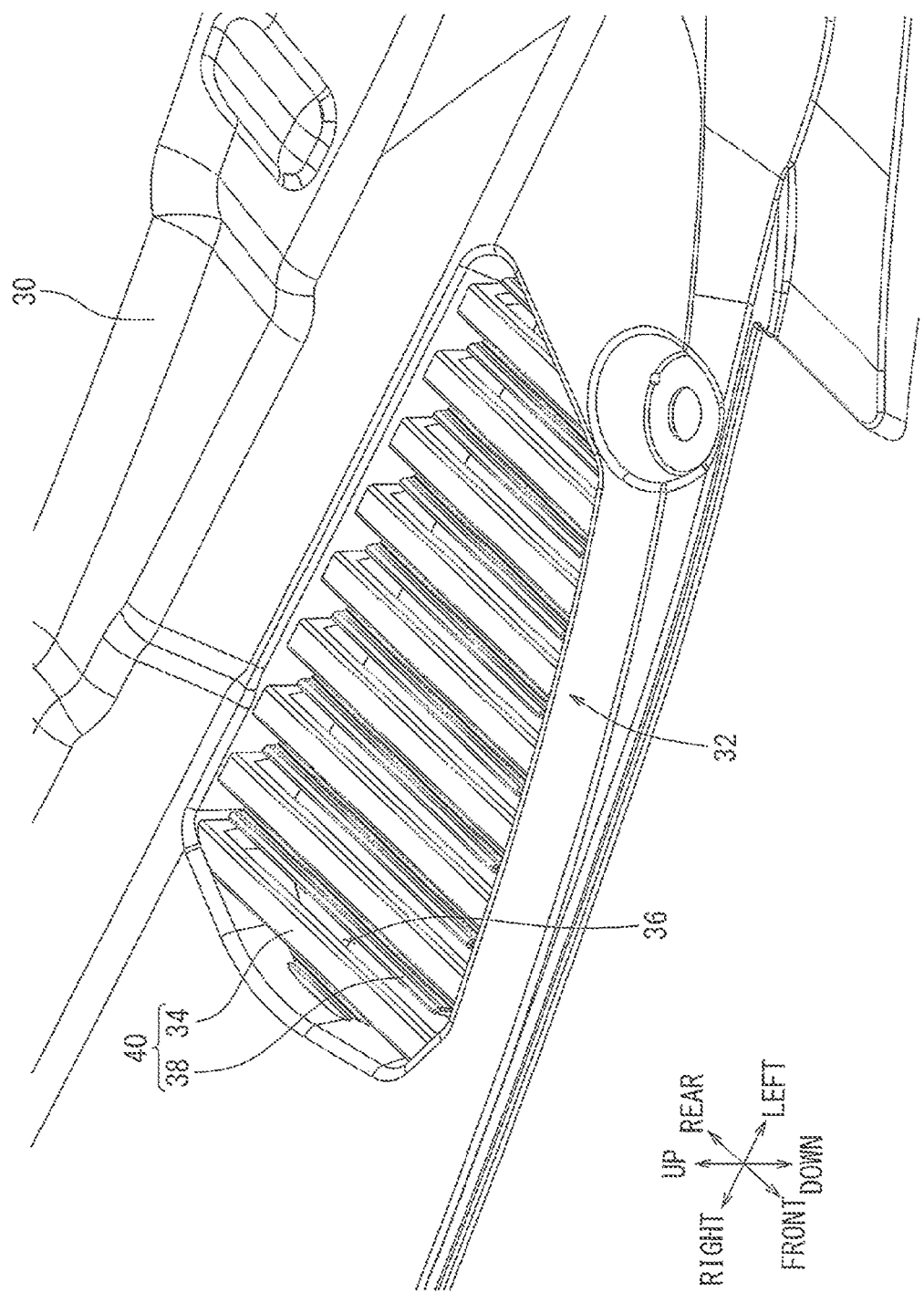
FIG. 5 is a perspective view of a left opening of the radiator support cover in FIG. 4.
Figure 6:
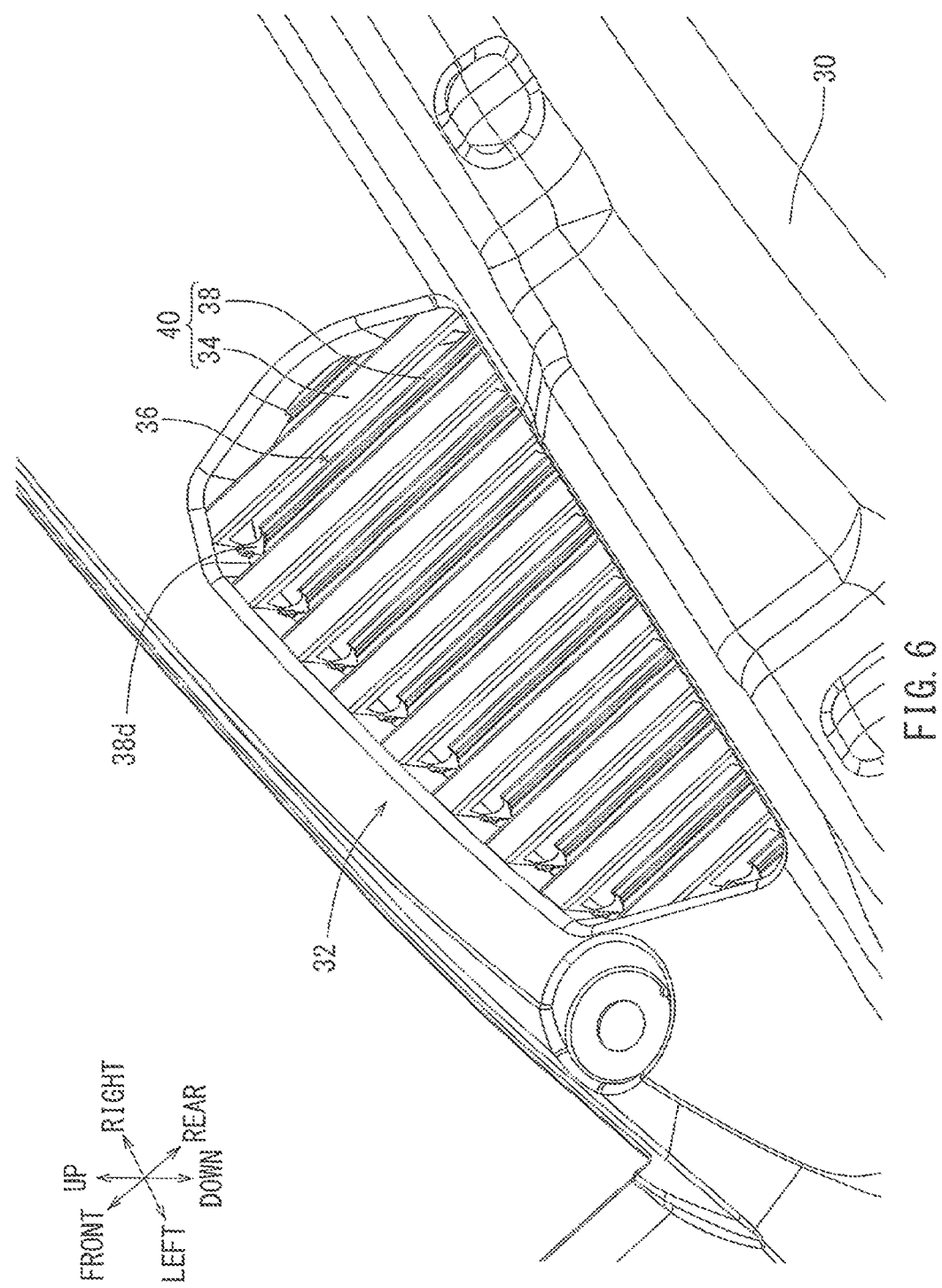
FIG. 6 is a perspective view of an opening of FIG. 5 as viewed from behind.

With reference to FIGS. 1 to 3, an engine room 10 is defined inside of a front F of the automobile 1. The engine room 10 is defined by a vehicle body and a plurality of components mounted on the vehicle body. The plurality of the components include, for example, left and right front fender panels 12, a front bumper 14, left and right headlights 16, a front grill 18 and a front hood 20. The front hood 20 is rotatably attached to the vehicle body such that it may be rotated about a right-left axis, to open and close the engine room 10. A radiator 22 may be provided at a position close to the front side, within the engine room 10. The radiator 22 is attached to a radiator support 24 which is mounted to the vehicle body.

A radiator support cover 30 for covering the radiator 22 is attached to the radiator support 24. An engine (not shown) is mounted in a position close to a rear side of the engine room 10. The front grill 18 is formed with a plurality of external air introduction vents 18a that are laterally elongated slits. Since the external air introduction vents 18a are formed as slits that are stacked side by side, it is possible to introduce only external air A in while forming a barrier, as shown in FIG. 3, which prevents intrusion of foreign objects (not shown) such as pebbles or snow when the automobile 1 is traveling.

With reference to FIGS. 4 to 8, the radiator support cover 30 is formed as a panel extending in the width direction (left-to-right direction) of the automobile 1 (see FIG. 1). The left and right regions of the radiator support cover 30 are formed with openings 32. The left and right openings 32 have a symmetrical configuration with respect to the longitudinal axis of the vehicle, running perpendicular to and through the center of the left to right center line of the radiator support cover 30. A plurality of slit-like external air supply vents 36 are defined in the openings 32. The external air supply vents 36 are defined by a plurality of gutter members 40 which are elongated in the front-to-rear direction.

Figure 7:
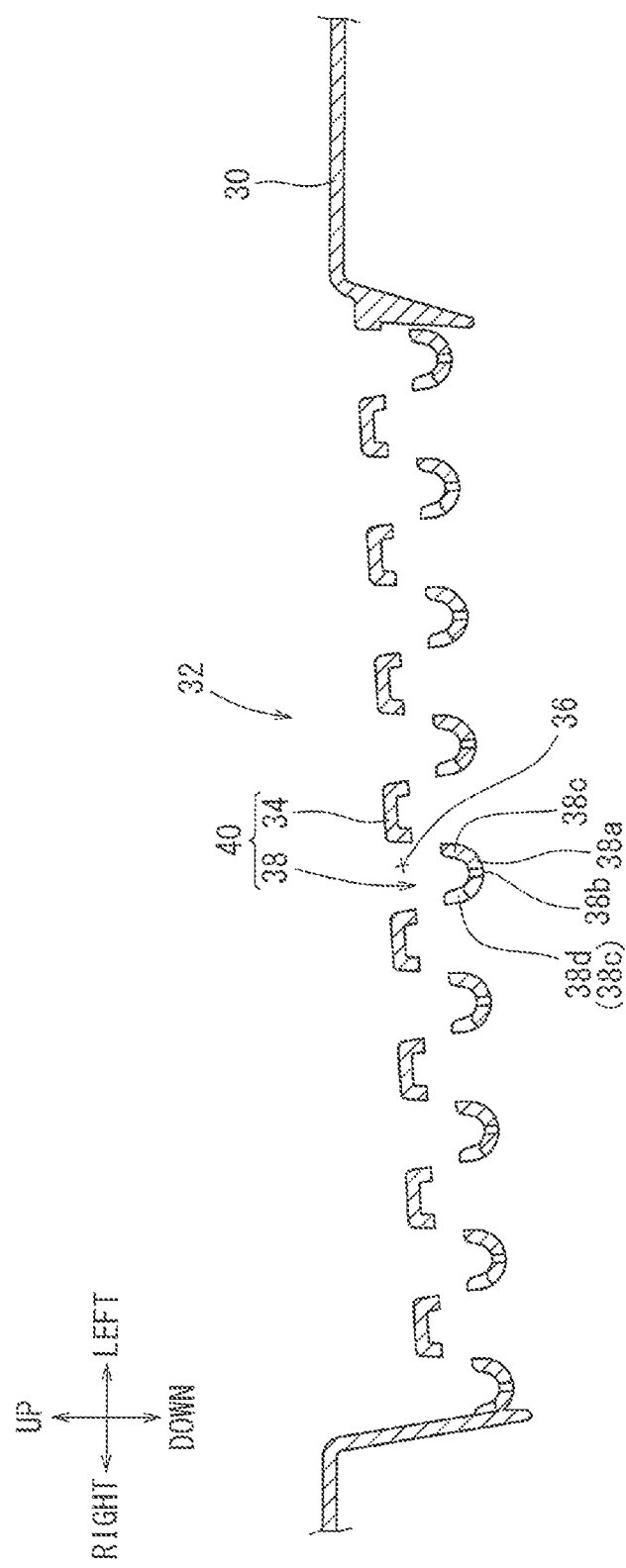
FIG. 7 is a vertical cross-sectional view taken along a left-to-front direction.

Therefore, the external air A is introduced through the plurality of the external air introduction ports 18a at the front grill 18 and is supplied to an intake duct (not shown) of the engine, and then through the external air supply vents 36 while the automobile is traveling. As shown in FIG. 7, each gutter member 40 includes an upper gutter member 34 and a substantially U-shaped lower gutter member 38. The lower gutter member 38 has a vertical cross-section (cross-sectional plane perpendicular to the longitudinal axis of the vehicle) in a substantially U-shape taken along the left-to-right direction, and is elongated in the front-to-rear direction. The upper gutter members 34 and the lower gutter members 38 are positioned in an alternating manner in the left-to-right direction, along the width of openings 32.

The upper gutter member 34 is positioned above to cover space between two adjacent lower gutter members 38 in the left-to-right direction along the width of openings 32. The lower gutter member 38 is positioned below the upper gutter member 34 to cover space between two adjacent upper gutter members 34 from below in the left-to-right direction along the width of openings 32. Therefore, the collective configuration of the upper gutter members 34 and the lower gutter members 38 in the left-to-right and front-to-rear directions inside the openings 32 make it difficult for an operator to look down from above through the external air supply vents 36, and see inside the engine room 10. Therefore, the operator who opens the front hood 20 covering the engine room 10 is prevented from seeing the radiator 22 through the external air supply vents 36.

The lower gutter member 38 is configured in a substantially U-shape formed with a bottom portion 38a and left and right side portions 38c. The lower gutter members 38 are installed at a tilted angle with respect to the front-to rear horizontal axis. More specifically, the lower gutter members 38 are installed at a tilted angle which tilts downward from rear to front. Accordingly, the front end of the lower gutter member 38 is positioned lower than the rear end of the lower gutter member 38. As shown in FIG. 8, a drain hole 38b is formed at the front region (closer to the lower end) of the bottom portion 38a of each lower gutter member 38 in order to drain any water (rain water, car wash water etc.) accumulated in the substantially U-shaped bottom portion 38a. A notch 38d in a substantially semi-circular shape (half circular shape) in the up-down front-rear directional plane is formed at the front of one of the left and right side portions 38c of the lower gutter member 38.

For example, the notch 38d may be formed at the front (closer to the lower end) of one of the side portions 38c, which is located on the inner side of the automobile 1. More specifically, the notch 38d may be formed at the right side portion 38c of the lower gutter member 38 within the left opening 32. The notch 38d is formed at the left side portion 38c of the lower gutter member 38 within the right opening 32. The lower gutter member 38 is installed at a tilted angle not only with respect to the front-to-rear direction, but also with respect to the left-to-right direction, where its inner side may be oriented downward, toward one of the left and right sides, whichever is provided with the notch 38d. Specifically, the inner side portion 38c, with the notch 38d, is installed to be lower than the outer side portion 38c. The radiator support cover 30 is integrally formed, for example, with resin (for example, PP) having rigidity.

With reference to FIG. 3, external air A is introduced into the automobile 1 through the external air introduction ports 18a of the front grill 18 while the automobile 1 is traveling. The external air A1, which is a first branched off part of external air A, is utilized for cooling the radiator 22 provided in the engine room 10. The external air A2, which is a second branched off part of the introduced external air A, is supplied to the vehicle engine through the openings 32 of the radiator support cover 30.

The radiator support cover 30 includes a plurality of the gutter members 40 arranged side-by-side width-wise, where each gutter member 40 includes an upper gutter member 34 and a substantially U-shaped lower gutter member 38. The gutter members 40 interrupt the view from the top to the bottom. Therefore, the aesthetic appearance of the interior of the engine room 10 is enhanced when the front hood 20 is opened. Each substantially semi-circular (half circular) notch 38d is formed at the front end of each lower gutter member 38. The notches 38d further serve to reduce passing resistance of the external air A2 at the lower gutter member 38. Therefore, a large quantity of the external air A2 may be supplied to the engine.

The front region of the radiator support cover 30 is planar and the planar portion extends along the width of the front end of the automobile 1. The openings 32 are formed at the right and left positions of the planar portion, respectively and the gutter members 40 are arranged to be in a height position lower than the upper surface of the planar portion. Each notch 38d is formed at the front end of each lower gutter member 38 of the gutter member 40. Due to the lower height and tilt at the front end of each lower gutter member, the front side of each lower gutter member 38 is concealed by the higher planar portion at the front region of the radiator support cover 30 as viewed from the upper front side. Therefore, the operator standing in front of the automobile 1, when opening the front hood 20, can hardly see the notches 38d due to the planar portion. As a result, the aesthetic appearance of the interior of the engine room 10 is enhanced while the front hood 20 is opened.

The notch 38d is formed at the front portion of each lower gutter member 38. Therefore, due to the lowered air resistance, the quantity of the external air A2 flowing into the engine room 10 increases compared to the case where each notch 38d is formed at the rear portion of each lower gutter member 38. This is because pressure on the radiator 22 side positioned near the rear side of the external air introduction ports 18a will be higher than pressure near the external air introduction ports 18a due to the current of external air during the travel of the vehicle. Therefore, the external air introduced through the external air introduction ports 18a into the automobile 1 flows easily into the engine room 10 through the notches 38d located in front of the lower gutter members 38 at the lower pressure region, and avoids passing through sections where the pressure is high.

The notch 38d is formed at the inner side portion 38c of the lower gutter member 38. The lower gutter member 38 is installed at a tilted angle relative to the left-to-right direction with its inner side oriented downward. Therefore, the notch 38d is positioned lower than the outer side portion 38c of the lower gutter member 38, and this angular orientation causes the notch 38d to hardly be visible from above. Consequently, the appearance of the interior of the engine room 10 is improved while the front hood 20 is opened.

In the aforementioned exemplary embodiment, an automobile (passenger car) 1 is described as an example of a vehicle, however, not limited thereto, any various types of vehicles may be used.

Figure 9:
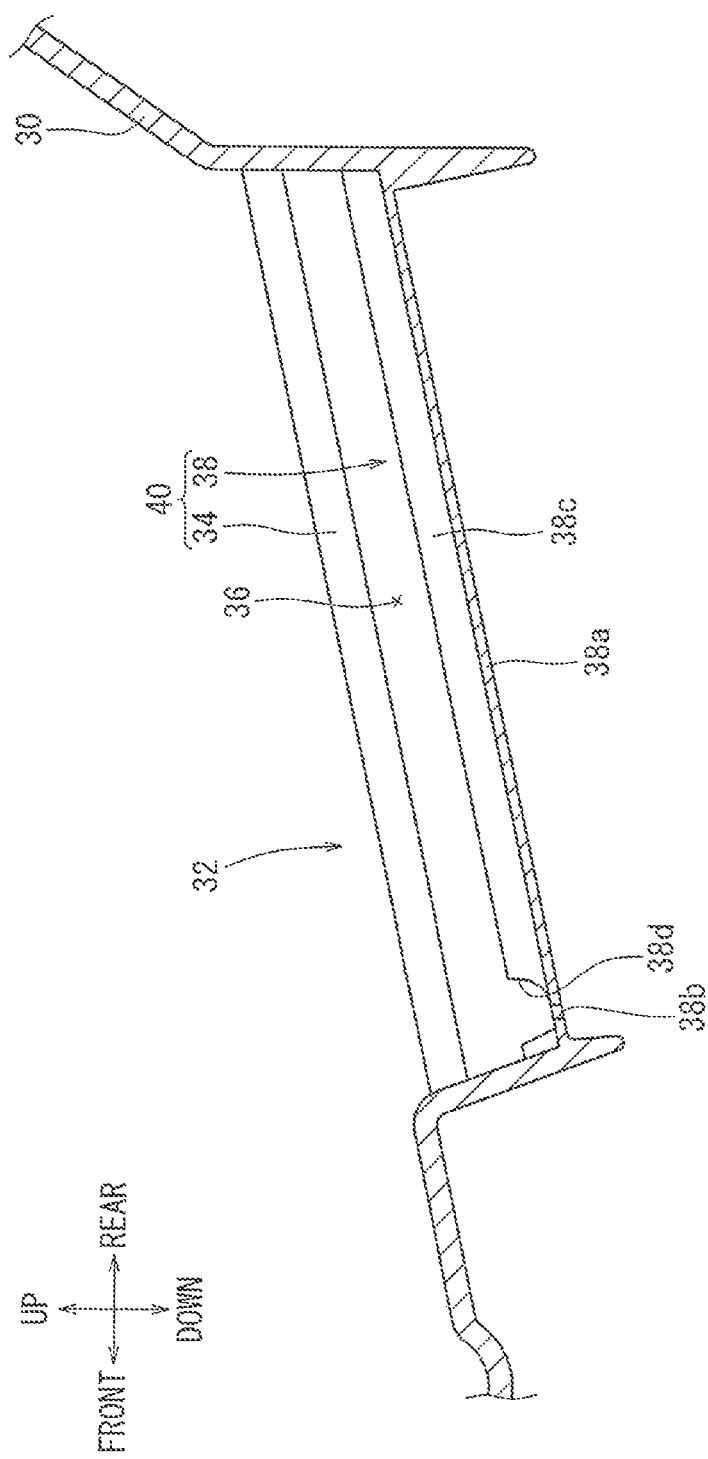
FIG. 9 is a cross-sectional view of an opening indicating a notch according to another exemplary embodiment.
Figure 10:
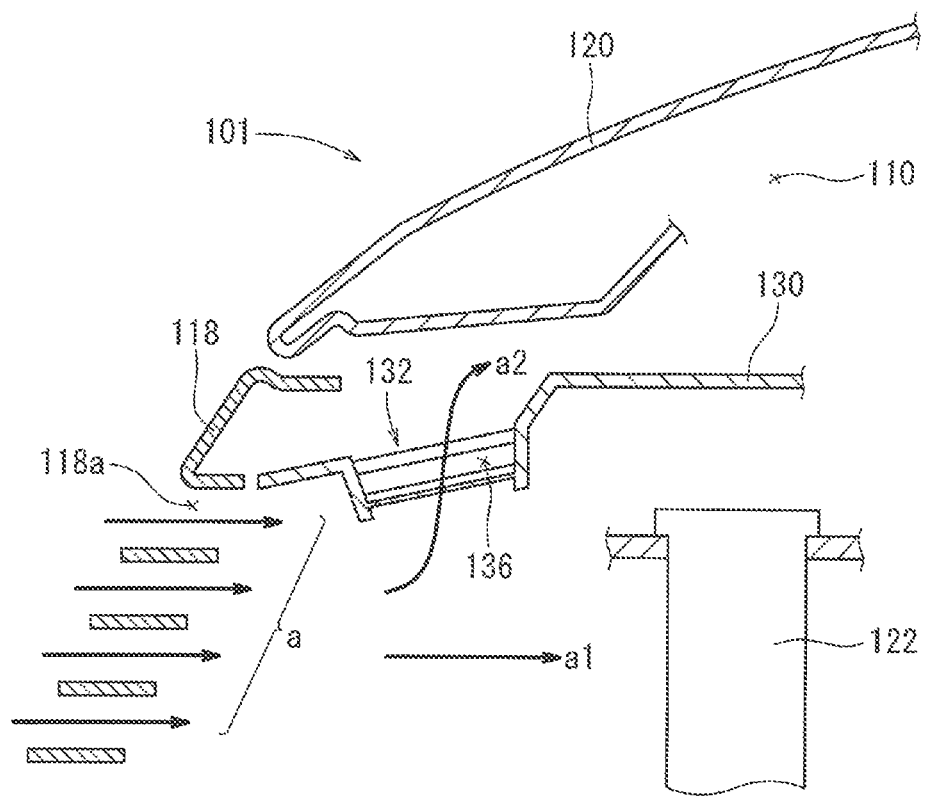
FIG. 10 is a schematic vertical cross-sectional view of a front of an automobile according to the conventional configuration.
Figure 11:
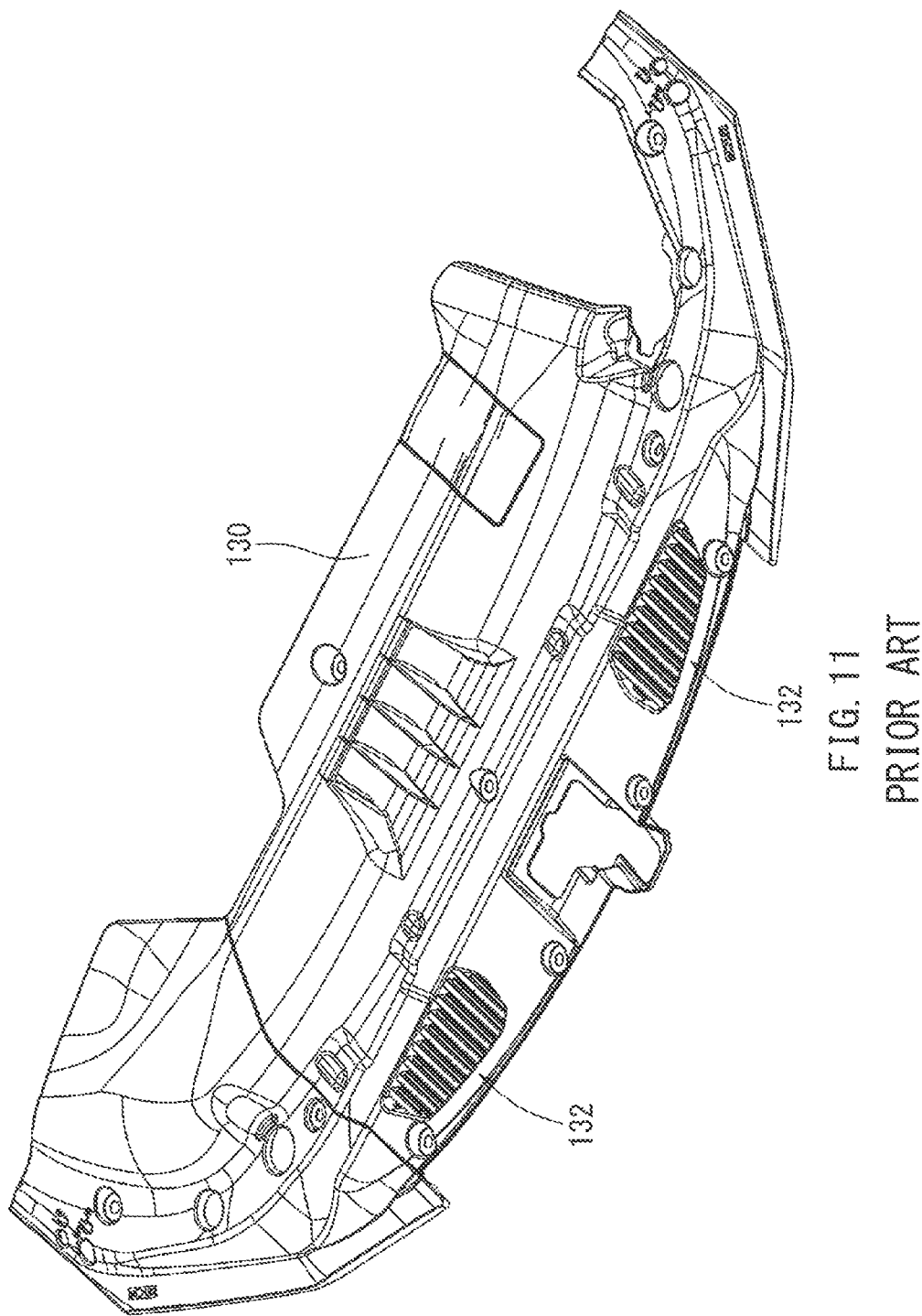
FIG. 11 is a perspective view of a radiator support cover according to the conventional configuration.
Figure 12:
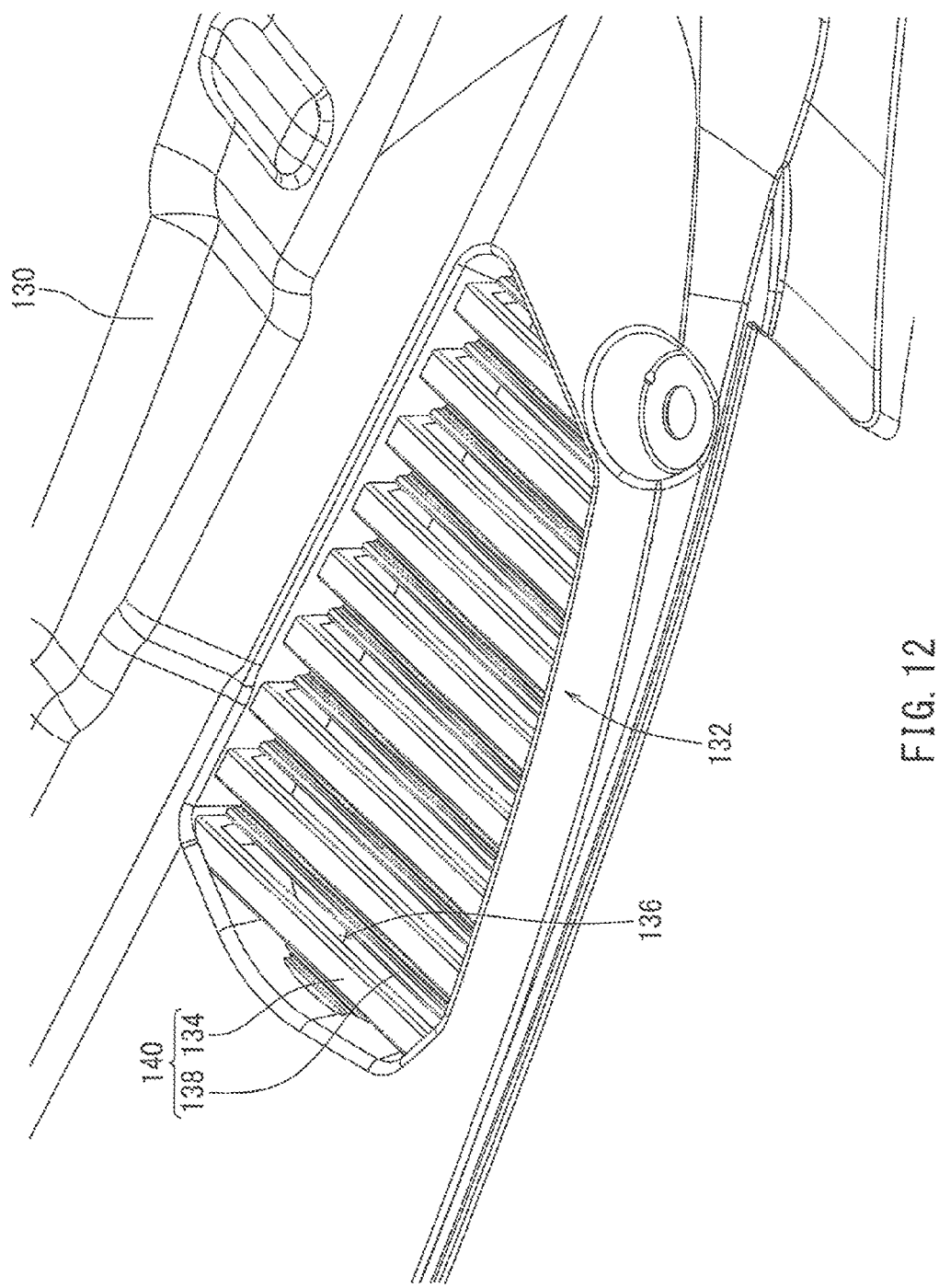
FIG. 12 is a perspective view of a left opening of the radiator support cover in FIG. 10.
Figure 13:
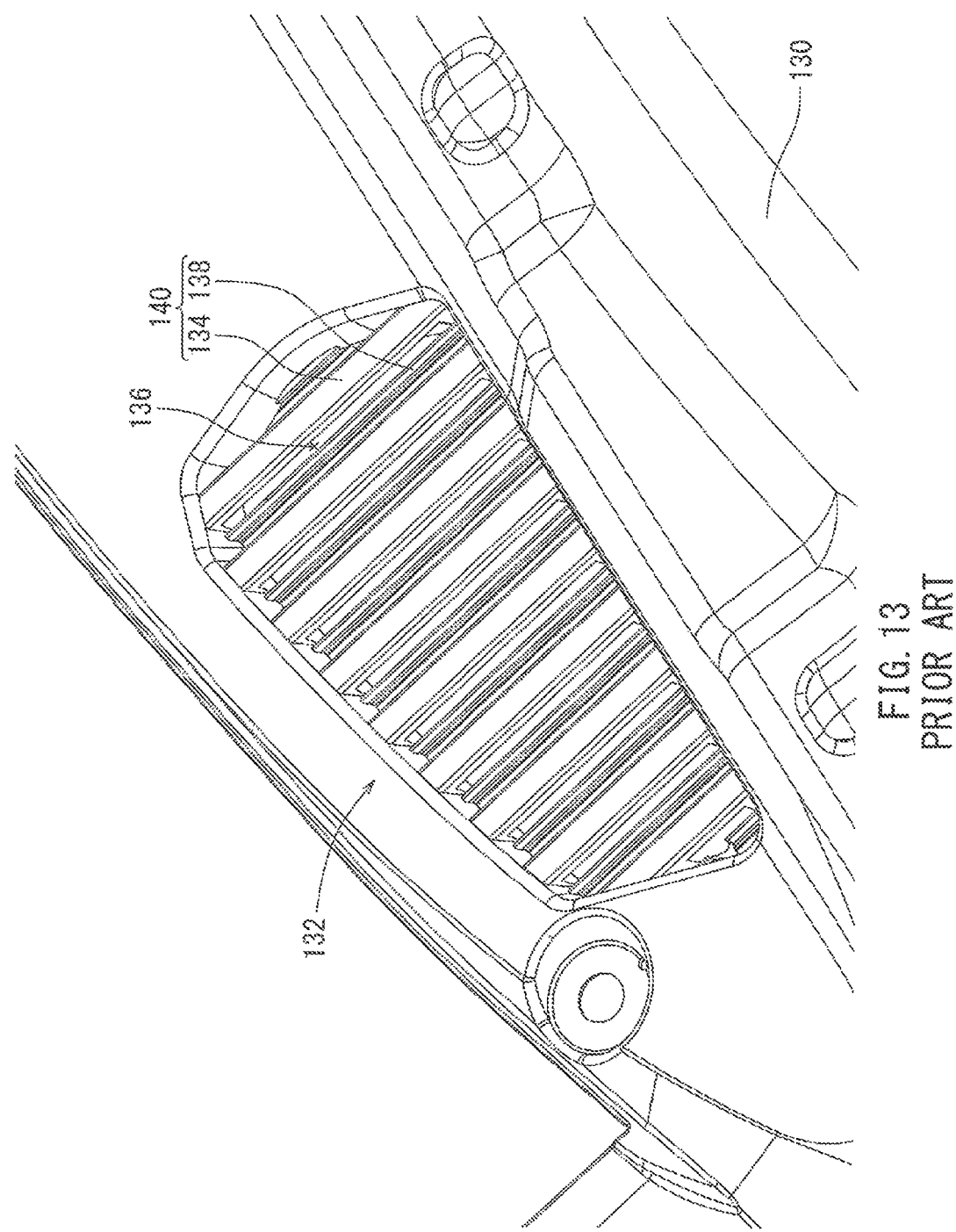
FIG. 13 is a perspective view of the opening in FIG. 12 as viewed from behind.
Figure 14:
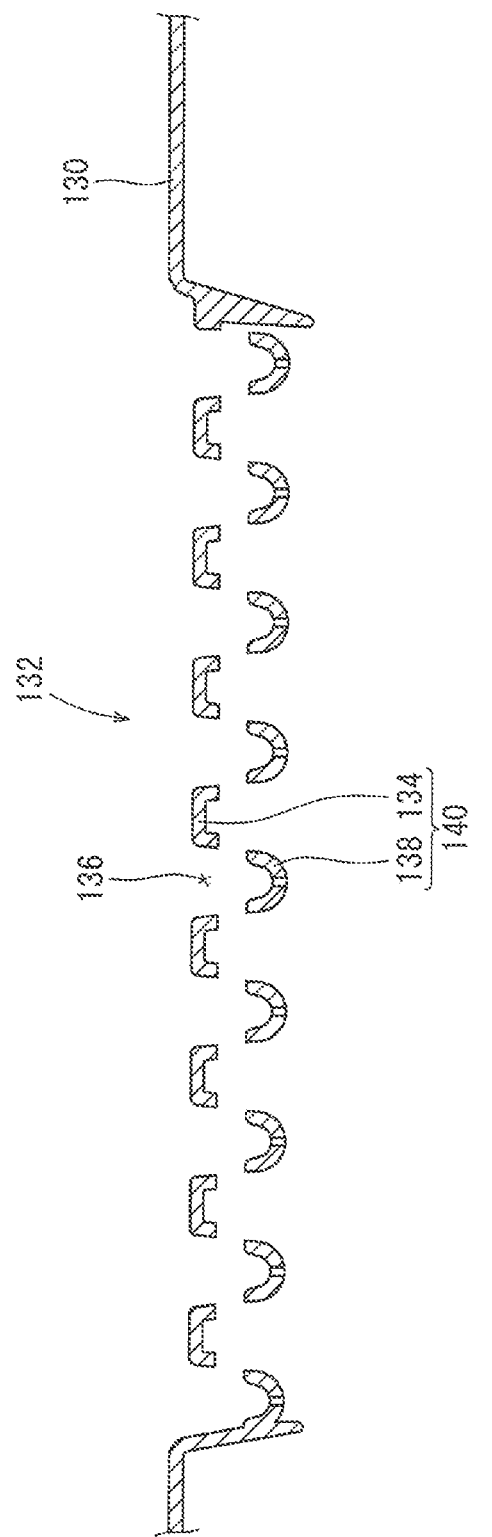
FIG. 14 is a vertical cross-sectional view of FIG. 12 taken along the left-to-right direction.

In the aforementioned exemplary embodiments, the notch 38d is formed in a substantially semi-circular shape (half circular shape). However, it is not limited thereto, the notch 38d may also be formed in a quarter-circular shape as shown in FIG. 9.

In the aforementioned exemplary embodiments, each notch 38d is formed at all lower gutter members 38. However, not limited thereto, a notch 38d may be formed at only one or some of lower gutter members 38.

The various examples described above in detail with reference to the attached drawings are intended to be representative of the invention and are thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide an improved radiator support cover for a vehicle, and/or methods of making and using the same.

The invention claimed is:

1. A radiator support cover for covering a top of a radiator for a vehicle, the radiator support cover comprising:
   a plurality of gutter members; and
   a plurality of external air supply vents defined between the gutter members, wherein the plurality of the external air supply vents is configured to allow external air introduced through a front grill of a vehicle to flow towards an engine;
   wherein each of the gutter members includes an upper gutter member, and a lower gutter member positioned below the upper gutter member and being offset widthwise with respect to the upper gutter member,
   wherein the lower gutter member is arranged at a tilted angle with respect to a horizontal line, and
   wherein a notch is formed close to a lower end of the lower gutter member.

2. The radiator support cover for a vehicle of claim 1, wherein the gutter members are elongated in a front-to-rear direction of a vehicle, and wherein the lower gutter members are arranged so that their front ends constitute their lower ends.

3. The radiator support cover for a vehicle of claim 2, further comprising:
   a planar portion; and
   an opening formed at the planar portion,
   wherein the lower gutter members are arranged in the opening and positioned below an upper surface of the planar portion.

4. The radiator support cover for a vehicle of claim 1, wherein the upper gutter members and the lower gutter members are alternately arranged in their width direction so that an operator can hardly see a radiator through the external air supply vents while a front food for covering an engine room is opened.

5. The radiator support cover for a vehicle of claim 1, wherein each of the lower gutter members has a U-shaped cross-section.

6. The radiator support cover for a vehicle of claim 5, wherein each of the lower gutter members includes a bottom portion, an inner side portion positioned at an inner side of a vehicle in a lateral direction of the vehicle and an outer side portion positioned at an outer side of the vehicle, and wherein the inner side portion is formed with the notch.

7. The radiator support cover for a vehicle of claim 6, wherein each of the lower gutter members is arranged at a tilt angle such that the inner side portion having the notch is located below the outer side portion.

8. A radiator support cover for covering a top of a radiator for a vehicle, the radiator support cover comprising:
   a plurality of gutter members;
   a planar portion, extending along a width of a front end of the vehicle transverse to a longitudinal axis of the vehicle; and
   a plurality of external air supply vents defined between the gutter members, wherein the plurality of the external air supply vents is configured to allow external air introduced through a front grill of the vehicle to flow towards an engine;
   wherein each of the gutter members includes an upper gutter member, and a lower gutter member positioned below the upper gutter member and displaced widthwise with respect to the upper gutter member,
   wherein the lower gutter member is arranged at a tilted angle with respect to a horizontal line, and
   wherein a notch is formed close to a lower end of the lower gutter member.

9. The radiator support cover of claim 8, wherein the plurality of gutter members are arranged at a height position lower than an upper surface of the planar portion.

10. The radiator support cover of claim 9, wherein the gutter members are elongated in a front-to-rear direction of the vehicle, and wherein the lower gutter members are arranged so that their front ends constitute their lower ends.

11. The radiator support cover of claim 10, wherein the front ends of the lower gutter members are tilted downward relative to the upper surface of the planar portion of the radiator support cover, such that the front ends of the lower gutter members are concealed by a front region of the radiator support cover, when viewed above, from the upper front side of the radiator support cover.

12. The radiator support cover of claim 1, wherein the notch formed at the lower end of the lower gutter members is in a semicircular shape.

13. A radiator support cover for covering a top of a radiator for a vehicle, the radiator support cover comprising:
   a plurality of gutter members arranged side-by-side within a plurality of openings in the radiator support cover; and
   a plurality of external air supply vents defined between the gutter members, wherein the plurality of the external air supply vents is configured to allow external air introduced through a front grill of a vehicle to flow towards an engine;
   wherein each of the gutter members includes an upper gutter member, and a lower gutter member positioned below the upper gutter member and displaced widthwise with respect to the upper gutter member,
   wherein the lower gutter member is arranged at a tilted angle with respect to a horizontal line, and
   wherein a notch is formed close to a lower end of the lower gutter member.

14. The radiator support cover of claim 13, wherein the notch formed at the lower end of the lower gutter members is in a semicircular shape.

15. The radiator support cover of claim 14, wherein the radiator support cover is planar portion, extending along a width of a front end of the vehicle transverse to a longitudinal axis of the vehicle.

16. The radiator support cover of claim 15, wherein the plurality of gutter members are arranged side-by-side within two openings within the planar portion, where the planar portion has two openings in total therein, wherein the openings have a symmetrical configuration with respect to the longitudinal axis of the vehicle, running perpendicular to and through the center of the width direction of the radiator support cover.

17. The radiator support cover of claim 16, wherein the front ends of the lower gutter members are tilted downward relative to the upper surface of the planar portion of the radiator support cover, such that the front ends of the lower gutter members are concealed by a front region of the radiator support cover, when viewed above, from the upper front side of the radiator support cover.

18. The radiator support cover of claim 17, wherein the upper gutter members and lower gutter members are positioned in an alternating manner within the openings of the radiator support cover, wherein the members span the entire length and breadth of the openings.

19. The radiator support cover of claim 18, wherein in a cross-section perpendicular to a longitudinal axis of the vehicle, the lower gutter members are substantially in a U-shape, formed with a bottom portion and left and right side portions, wherein the notch is made in one of the left and right side portions, wherein the lower and upper gutter members are tilted widthwise, relative a transverse axis of the vehicle, such that the side portion of the U-shape with the notch is tilted downward.

20. The radiator support cover of claim 13, wherein the notch is formed in a quarter-circular shape.

* * * * *